US007697494B2

(12) United States Patent
Sano

(10) Patent No.: US 7,697,494 B2
(45) Date of Patent: Apr. 13, 2010

(54) METHOD FOR ASSIGNING A UNIQUE WORD IN A COMMUNICATION SYSTEM

(75) Inventor: Masato Sano, Mountain View, CA (US)

(73) Assignee: Kyocera Corporation, Kyoto (JP)

( * ) Notice: Subject to any disclaimer, the term of this patent is extended or adjusted under 35 U.S.C. 154(b) by 700 days.

(21) Appl. No.: 11/280,593

(22) Filed: Nov. 15, 2005

(65) Prior Publication Data

US 2007/0110013 A1 May 17, 2007

(51) Int. Cl.
*H04W 4/00* (2009.01)
(52) U.S. Cl. .................. 370/338; 455/432.1; 455/435.1; 455/440
(58) Field of Classification Search .................. 370/338; 455/432.1, 435.1, 440
See application file for complete search history.

(56) References Cited

U.S. PATENT DOCUMENTS

| | | | | |
|---|---|---|---|---|
| 5,394,158 A | * | 2/1995 | Chia | 342/457 |
| 5,884,145 A | * | 3/1999 | Haartsen | 455/63.2 |
| 5,901,357 A | * | 5/1999 | D'Avello et al. | 455/454 |
| 7,155,485 B2 | * | 12/2006 | Clow et al. | 709/207 |
| 2001/0019952 A1 | * | 9/2001 | Ishida | 455/414 |
| 2004/0158646 A1 | * | 8/2004 | Miernik et al. | 709/249 |

FOREIGN PATENT DOCUMENTS

JP    2004-112590    4/2004
JP    2002-274640    8/2004

OTHER PUBLICATIONS

Abstract (English)—JP 2004 112590A, Publication Date-Aug. 4, 2004, "Radio Base Station, Reference Signal Assignment Method and Reference Signal Assignment Program", Sanyo Electric Co LTD, http //www.aurekaontap.com, 1 page, Nov. 14, 2005.
PHS MoU Group, "General Description of Public Personal Handy-Phone System", PHS MoU Document-A-GN0.00-01-TS, Version 01, pp. 1-13, Apr. 21, 1997.

* cited by examiner

*Primary Examiner*—Rafael Pérez-Gutiérrez
*Assistant Examiner*—Nimesh Patel

(57) ABSTRACT

A method and system for assigning unique words in an SDMA (spatial division multiple access) communication system is disclosed. A base station has a set of available unique words from which to select and assign unique words. The base station prioritizes the set of unique words by determining which unique words are likely to interfere with adjacent base stations, and setting those words to a low priority. In this way, over time, the base station assigns unique words that have a lower level of correlation to allow for better signal differentiation and improved communication sensitivity. When a mobile device enters a base station's geographic area, it generates an establish request message that indicates what unique word it is using in the adjacent cell. The base station extracts this unique word, and sets it to a low priority in its set of unique words. The base station is therefore able to assign unique words that facilitate improved communications.

22 Claims, 6 Drawing Sheets

METHOD FOR ASSIGNING A UNIQUE WORD IN A COMMUNICATION SYSTEM

FIELD OF THE INVENTION

The present invention relates generally to wireless communication systems, and more specifically to assigning unique words in an SDMA (spatial division multiple access) communication system.

BACKGROUND OF THE INVENTION

The deployment and use of wireless communication systems is dramatically increasing, with associated pressures to increase system capacity, bandwidth, and quality. One way to increase system capacity is by employing a multiple access process, which allows a scare system resource to be shared between multiple users. For example, some communication systems operate according to a TDMA (time division multiple access) process. In a TDMA communication system, a predetermined time frame is sub-divided into slots, and each user is assigned a slot for receiving and transmitting data or voice signals. In this way, multiple users are able to share the same time frame.

In another example, some communication systems operate according to an SDMA (spatial division multiple access). In an SDMA system, a directable antenna array is configured to allow a particular frequency to be used by multiple users operating in the same general geographic area. In use, each mobile user operates a device that is assigned a unique word prior to initiating data or voice communication with a base station. Thereafter, from time to time, the unique word is transmitted from the remote user, which assists the base station in determining the spatial signature of the remote device. In turn, this allows the base station to configure its directable antenna to better differentiate communication signals originating from different mobile devices, even though the devices are communicating on the same frequency. In this way, an SDMA communication system allows multiple uses to share the same frequency.

Some communication systems may use more than one multiple access process to further increase system capacity. For example, the PHS (personal handyphone system) communication system, which is widely deployed in Japan, combines the benefits of both TDMA and SDMA. That is, PHS divides a time frame into slots, and then assigns unique words with respect to each slot. In this way, each time frame allows for multiple users in the slots, and each slot allows for multiple access by using the same frequency. In PHS, the base station is generally referred to as the cell station, while the remote mobile device is referred to as the personal station.

The PHS system is a recognized international standard promulgated by ARIB (Association of Radio Industries and Businesses). More particularly, document RCR-STD-28 details the requirements and options available in a PHS communication system. For example, PHS, as with other SDMA communication systems, may be implemented with a limited number of available unique words. Although the unique words may be selected for low cross correlation effects, because there are a limited number available, unique words are reused throughout the PHS communication system. However, to enable the directable antenna to operate properly, it is important that the unique words for personal stations be different, and more importantly, to be different enough to support signal differentiation by the cell station. Accordingly, when a personal station makes a request to access the PHS cell station, the PHS cell station should consider which unique words are in use in an area around the requesting personal station.

Currently, there are two known techniques for attempting to avoid assigning the same unique word to two personal stations operating in the same general area. However, neither has proved satisfactory. First, the cell station may monitor the communication traffic channel ("TCH") being transmitted from neighboring cell stations to determine which unique words are currently in use in adjacent cells. However, monitoring the TCH channel requires signification system resources, and may degrade overall system capacity. Also, cells may not overlap sufficiently to allow a complete monitoring and accounting of all or nearly all of the unique words in use. Accordingly, monitoring TCH to assist in assigning unique words has not proved practical. Second, each cell station may attempt to randomize its assigning of unique words. However, even when each cell station randomly assigns words, it is possible to assign the same or similar unique words to personal stations operating in the same general geographic area. In this regard, two personal stations assigned such similar unique words will generate communication signals that are undesirably similar, and overall system capacity and quality will be reduced. Stated differently, it is desirable that the signals generated by such mobile stations have a low level of correlation to allow for better signal differentiation.

Therefore, there exists a need for a process and system for assigning unique words to achieve an improved system capacity, to lower interference, and to enable better signal differentiation.

SUMMARY OF THE INVENTION

Briefly, the present invention provides a method and system for assigning unique words in an SDMA (spatial division multiple access) communication system. A base station has a set of available unique words from which to select and assign unique words. The base station prioritizes the set of unique words by determining which unique words are likely to interfere with adjacent base stations, and setting those words to a low priority. In this way, over time, the base station assigns unique words that have a lower level of correlation to allow for better signal differentiation and improved communication sensitivity. When a mobile device enters a base station's geographic area, it generates an establish request message that indicates what unique word it is using in the adjacent cell. The base station extracts this unique word, and sets it to a low priority in its set of unique words. The base station is therefore able to assign unique words that facilitate improved communications.

In a more specific example, a method and system is disclosed for assigning unique words in a PHS (personal handyphone system) communication system. A cell station has a set of available unique words from which to select and assign unique words. The cell station prioritizes the set of unique words by determining which unique words are likely to interfere with adjacent cell stations, and setting those words to a low priority. In this way, over time, the cell station assigns unique words that have a lower level of correlation to allow for better signal differentiation and improved communication sensitivity. When a personal station enters a cell station's geographic area, it generates an establish request message that indicates what unique word it is using in the adjacent cell. The cell station extracts this unique word, and sets it to a low priority in its set of unique words. The cell station is therefore able to assign unique words that facilitate improved communications.

These and other features of the present invention will become apparent from a reading of the following description, and may be realized by means of the instrumentalities and combinations particularly pointed out in the appended claims.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION

Detailed descriptions of illustrative embodiments of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

Figure 1:
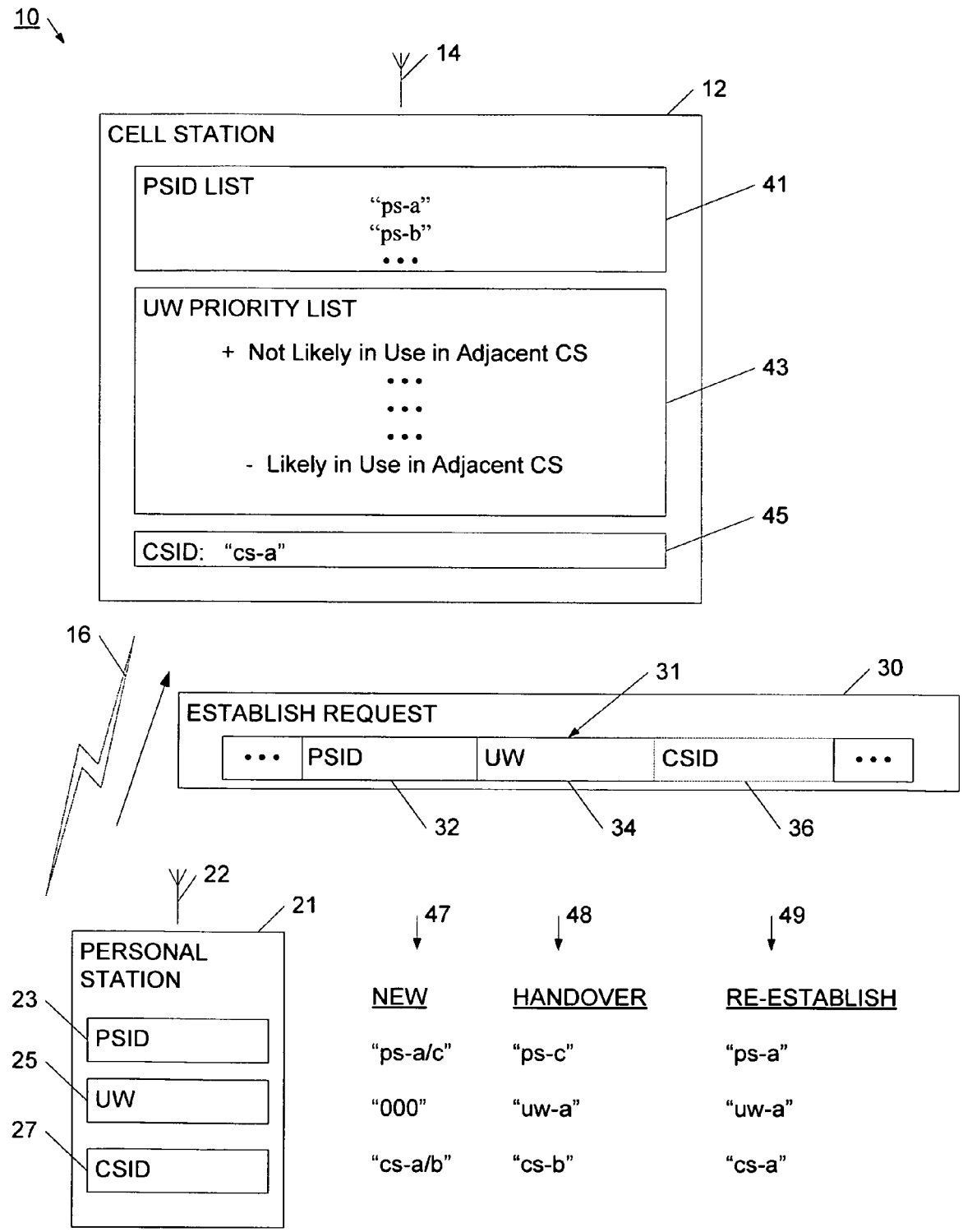
FIG. 1 is a block diagram of an SDMA communication system in accordance with one embodiment of the present invention.

Referring now to FIG. 1, communication system 10 is illustrated. Communication system 10 is illustrated as a PHS communication system. However, it will be appreciated that other communication systems employing an SDMA (spatial division multiple access) system may be used. The general design and implementation of an SDMA communication system is well-known, and, therefore, will not be described in detail. Communication system 10 has a set of base stations for communicating with a number of remote mobile devices. Each base station has a local area in which it communicates, which is often referred to as a "cell". Cells may be arranged in a pattern so that adjacent cells somewhat overlap. In this way, as a mobile device moves from one cell to another, one base station may hand off the communication to the other base station in an orderly and controlled manner. This handoff process is often referred to as a soft handoff or handover. In FIG. 1, communication system 10 is illustrated with one base station in the form of PHS cell station 12 which is communicating with a mobile device in the form of PHS personal station 21. Although only one cell station 12 is illustrated, it will be appreciated that several cell stations may be provided. In a similar manner, only one personal station 21 is illustrated, although it will be appreciated that many personal stations may be used.

Cell station 12 includes antenna 14 and other infrastructure equipment for providing wireless communication to personal station 21. Personal station 21 also includes antenna 22 and an associated radio for receiving and transmitting communications with cell station 12. In this way, communication link 16 is established between cell station 12 and personal station 21. It will be appreciated that the design and implementation of communication base stations and mobile devices is well-known, and will not be described in detail.

Personal station 21 includes PSID 23 (personal station ID) which uniquely identifies personal station 21. Personal station ID 23 may be, for example, a number or other value predefined during the manufacturing process. In another example, personal station ID 23 is assigned during initialization or deployment of the personal station. Since communication system 10 operates according to an SDMA process, personal station 21 also includes UW 25 (unique word). Unique word 25 is assigned by cell station 12, and is used for determining the spatial signature of personal station 21 during communication processes. This spatial signature assists cell station 12 in directing its antenna array, as well as in differentiating the communication signal arriving from personal station 21. At termination of the communication with the cell station, UW 25 is released. The use and implementation of a unique word in an SDMA system is well-known, and, therefore, will not be discussed in detail.

It will also be appreciated that the number of available unique words varies according to the particular communication system in use. Typically, a communication system has a limited number of unique words available for use, so unique words are shared and reused across the communication system. In some cases, the number of unique words assigned to each cell station will be a set number, and the numbers will be pre-assigned during system configuration. To enable configuration flexibility, the number of unique words assigned to each cell station may exceed the number of unique words that the cell station will be permitted to assign. For example, each cell station may be preassigned a set of ten unique words. However, each cell station may be permitted to assign only three unique words at any one time. Thus, the cell station is allowed to choose which three out of the ten unique words that will be in use at any one time. It will be appreciated that the number of unique words in the set, and the number of unique words assigned, may be adjusted according to the needs and configuration of the communication system.

Cell station 12 maintains this list of available unique words, and monitors which unique words are in current use in its cell. As will be described in more detail below, the cell station has a set of available unique words, and by discovering which unique words are in use in adjacent cells, may adjust the priority of the unique words so that more desirable unique words are assigned. For example, the cell station may evaluate its set of unique words to determine which unique words are most likely to have the lowest cross correlation with unique words likely to be used in adjacent cells. By assigning unique words according to this priority, better communication quality and signal separation may be obtained. Also, since each cell autonomously adapts its prioritized list of unique words, changes may be made to the overall communication system, and each cell station will quickly adapt to the change. For example, if a cell station is permitted to assign more unique words due to heavy traffic, other cell stations will automatically adapt and prioritize their sets of unique words according to the new system configuration. This level of autonomous adaptability eases system management, and enables the overall communication system to continually make adjustments for improved performance.

Personal station 21 may also store CSID 27 (cell station ID), which indicates a unique identifier for the cell station with which personal station 21 is currently communicating. It will be appreciated that the CSID, if used, will be updated and changed according to which cell station the personal station is currently communication with.

Figure 2:
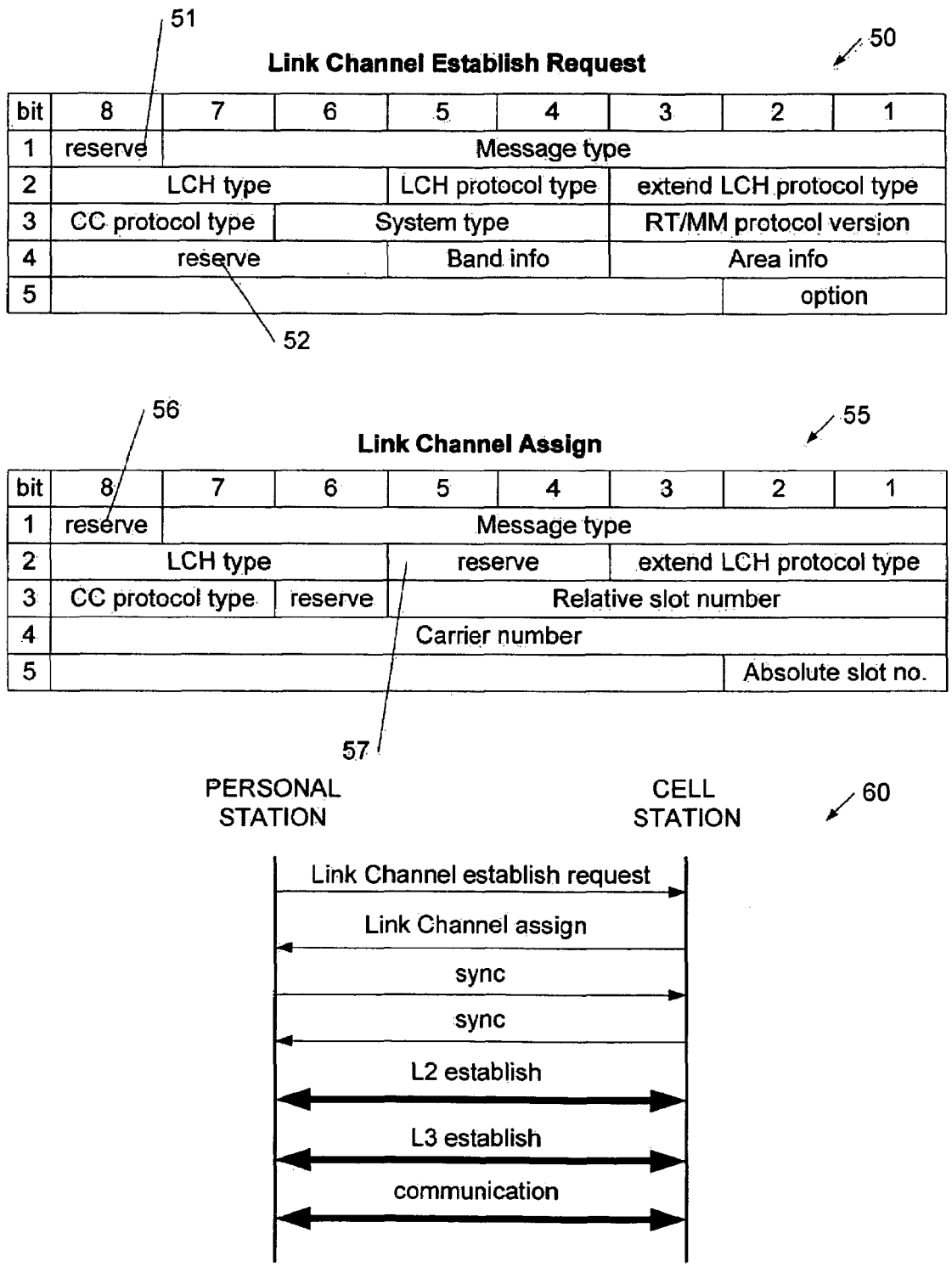
FIG. 2 is a diagram of message frames and messaging in a SDMA communication system in accordance with one embodiment of the present invention.

From time to time, a personal station may request that a communication session be established with a cell station. For example, a personal station may generate an establish request that a new call be placed using a currently available cell station. In another example, the personal station is in a call while moving through one cell, and as the personal station transitions into an adjacent cell, generates an establish request to handoff the call to the cell station in the adjacent cell. In yet another example, the personal station may determine that the signal from its current cell station is weakening, and generate an establish request. However, in some cases the current cell station is the best available base station, so the request merely reestablishes communication with the existing cell station When personal station 21 generates establish request 30, establish request 30 includes message 31 having several fields. For example, message 31 may include personal station ID field 32 for identifying that it is personal station 21 making the request. Message 31 may also include a unique word field 34 which includes information indicative of the current unique word being used. In the case where personal station 21 is not currently in a call, unique word field 34 may be set to indicate that no unique word value is currently assigned. For example, unique word field 34 may be set to all zeros to indicate that personal station 21 is requesting a new call be established. Message 31 may also optionally have a cell station ID field 36, which is used to indicate which cell station personal station 21 is currently communicating with. In the case of a handoff call, CSID field 36 would indicate which cell station the mobile device is arriving from. Message 31 also includes other fields required or useful to implement a communication system. The generation and formation of these additional fields is well-known in the industry, and, therefore, will not be described in detail. However, FIG. 2 illustrates message frames for establish messages in a PHS communication system.

Referring again to FIG. 1, establish request message 31 is received at cell station 12. Cell station 12 includes personal station ID list 41 which indicates personal stations known to be in cell station's 12 area. Since message 31 includes PSID field 32, cell station 12 may determine if personal station 21 has already been operating with cell station 12. In some cases, message 31 may also have CSID field 36. Since cell station 12 is aware of its own cell station ID 45, cell station 12 may determine if personal station 21 is arriving from another cell station. Accordingly, cell station 12 uses a personal station ID or a cell station ID to determine if a received establish request is from another cell station. In another example, since the cell station 12 is aware of which unique words it currently has assigned, a personal station using and reporting one of the assigned unique words can also be assumed to be already communicating with cell station 12.

Cell station 12 is also responsible for assigning unique words to personal stations making establish requests. In making this assignment, the cell station assigns high priority unique words responsive to receiving the establish request. An example of the assignment message is illustrated in FIG. 2. Accordingly, cell station 12 stores a set of available unique words in a list 43. The list of unique words may be originally provided without priority, or may have some priority set according to some default process. However, over time, cell station 12 adjusts the priority of the unique words to allow the cell station to select unique words that have a lower level of word-to-word correlation. Selecting unique words with lower correlation allows for better signal differentiation between signals generated by the mobile stations. Take the specific example where personal station 21 is arriving from an adjacent cell. In this case, personal station 21 generates establish request message 31 as a handover message 48. Personal station 21 generates message 31 to include its personal station ID (ps-c) or the identification of the cell station with which it is currently communicating (cs-b). The establish message 31 also includes information indicative of the unique word currently in use (uw-a). When the handover message is received by cell station 12, cell station 12 compares the received PSID to its PSID list 41, or compares the received CSID to its CSID 45, and determines that personal station 21 is a new arriving personal station.

Cell station 12 also extracts information regarding the unique word that personal station 21 has been using in the adjacent cell. The cell station uses the unique word extracted from personal station 21 to adjust its priority list 43. For example, if the unique word is already in the priority list, the unique word is moved to a lower priority. The unique word from the adjacent cell may also be compared to each of the unique words in the set of available unique words. The comparison may included an evaluation of the level of probable cross-correlation between unique words. Since low cross correlation is desirable, unique words with lower cross correlation effects may be set to a higher priority. Since the unique words extracted from arriving personal stations indicate unique words in use in adjacent cells, by lowering the priority of those unique words and unique words with high correlation, unique words with better correlation effects may be assigned. In a further refinement of the prioritization list, the cell station may track the direction associated with arriving unique words. In this way, when a low priority unique word must be assigned, it can be assigned to a personal station at a location more distant from the adjacent cell previously using that unique word. In this way, even though some low priority unique words may have to be used, cross correlation may still be improved, at least as long as the personal station remains spaced away from the cell where that unique word was previously used.

In some cases however, cell station 12 will not adjust priority responsive to an establish request. For example, in the case where personal station 21 is establishing a new call 47, establish request message 31 has its unique word field 34 set to all zeros, for example. In this way, cell station 12 may determine that personal station 21 is not using any current unique word, and is requesting a new unique word be assigned. Accordingly, cell station 12 reviews its priority list 43, and assigns a high priority unique word. Since high priority unique words are not likely to have undesirable cross-correlation effects with unique words used in adjacent cells, better signal separation and sensitivity may be achieved. In another example, personal station 21 may be in a call with cell station 12, but approaching the fringe of the cell or receiving a weakened signal. In such a case, personal station 21 may generate an establish request signal 31. However, cell station 12 may still be the most appropriate cell station, so cell station 12 receives reestablish call 49, and determines that it is already in communication with personal station 21. Accordingly, cell station 12 may continue the communication without assigning a new unique word, and without adjusting its priority list. In a specific example, priority list 43 may have been updated after personal station 21 was assigned its unique word. When personal station 21 makes a reestablish request 49, cell station 12 may determine that a higher priority unique word is available. In this case, cell station 12 may reassign a new unique word to personal station 21.

Referring now to FIG. 2, an example of link messages for an SDMA system is illustrated. Message 50 shows how a message frame for a PHS link establish request may be used to transmit PSID and unique word information from a personal station to a cell station. Message 50 shows that the current PHS link establish request has reserve frame 51 and reserve frame 52, which may be used to transmit the additional PSID and unique word information. More specifically, these reserve frames may be assigned to allow a personal station to transmit its PSID, as well as its currently used unique word, when making a link establish request. Optionally, the personal station may also transmit the CSID of the cell station it is currently communicating with. If the personal station is not currently in a call, and is not currently using a unique word, the unique word field may be sent with an inactive indicator, such as all zeros.

A cell station may assign a unique word responsive to the establish request. For example, link channel assign message 55 may be used in a PHS communication system. In some systems, it may also be desirable to pass additional information from the cell station to the personal station. For example, additional information may be sent that is indicative of the cell station's CSID. If such additional information is to be transmitted to the personal station, the cell station may use available reserve frames 56 and 57 in link channel assign message 55 to accommodate such requirements.

Communication process 60 shows the general flow of messages in a PHS communication system. As illustrated, a personal station first makes a link channel establish request generally in the form as shown in message 50. If this is a handoff call, the link channel establish request may send the unique word that the personal station is using with the existing cell station. If it is a new call, the unique word field may be all zeros, for example. The cell station uses the received unique word to prioritize its list of available unique words, and selects a high priority unique word. The cell station responds to the personal station with a link channel assignment generally in the form as shown in message 55. The link channel assignment may include the selected high priority unique word, which the personal station will then use to establish further communication with the cell station. The Synchronization messages are exchanged, and L2 and L3 communications are established. Finally, a full communication path is opened and used. It will be appreciated that this is only a general description of the communication process, and one skilled in the art will recognized that detail steps have not been indicated.

Figure 3:
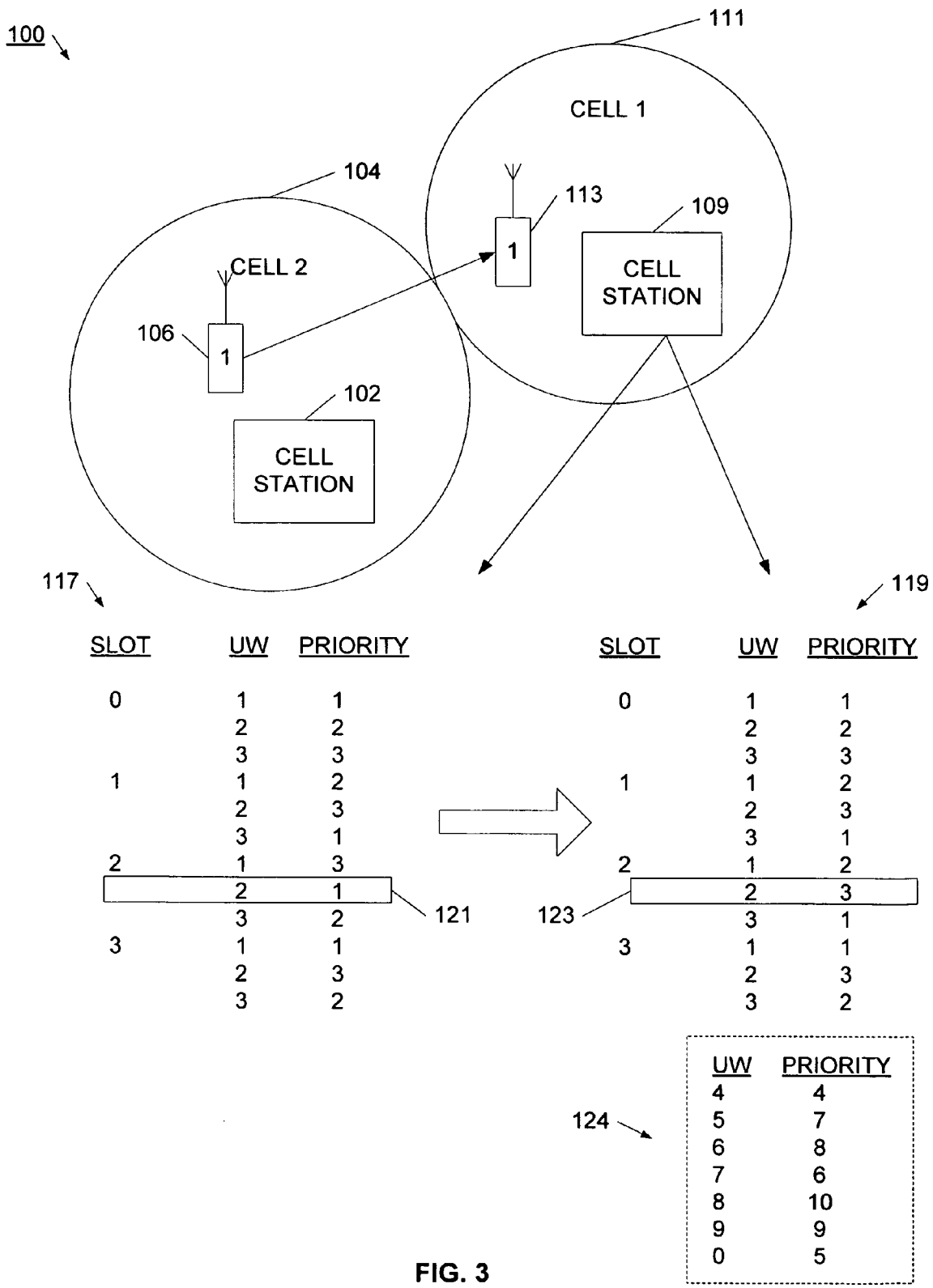
FIG. 3 is a diagram of an SDMA communication system in accordance with one embodiment of the present invention.

Referring now to FIG. 3, communication system 100 is illustrated. Communication system 100 illustrates cell station 102 having geographic coverage area 104, and cell station 109 having geographic coverage 111. In communication system 100, personal station 1 establishes communication with cell station 102 while at position 106. Personal station 1 is in motion, and moves into geographic area 111 and desires to establish communication with cell station 109. Cell station 109 maintains a prioritized list of unique words. List 117 illustrates the prioritized list when personal station 1 is at position 106. In list 117, highlight 121 shows that in time slot number 2, the unique word 2 is at a high priority of 1. It will be appreciated that the value of unique words is for illustration purposes only and that other values for unique words will be used in actual implementation. In a similar manner, list 117 shows a priority range between 1 and 3. It will be appreciated that more or less granularity may be provided for priority list, and that priority may be set in a more sophisticated manner.

When personal station 1 that moves into geography 111, personal station 1 generates an establish request which is received by cell station 109. Cell station 109 determines that personal station 1 is an arriving personal station by analyzing the arriving station's PSID or CSID value, which was transmitted to the cell station in the establish request message. Also, cell station 109 extracts information indicative of what unique word the personal station has been using while operating in geography 104. In this case, personal station 1 was using unique word 2 in time slot 2. Accordingly, cell station 109 updates its priority list to list 119. As indicated in highlight 123, the time slot 2 unique word 2 now has been set to the lowest priority of 3. In this way, when another personal station needs to be assigned a unique word in time slot 2, unique word 1 or unique word 3 will be assigned before unique word 2. By lowering the priority of unique word 2, interference and cross correlation issues with cell station 102 may be reduced. Over time, the priority list maintained by cell station 109 will set priorities according to knowledge gained of which unique words are likely to be used in adjacent cells. Accordingly, communication sensitivities and cross correlations may be improved.

In another example, cell station 109 may further adjust the priority of its set of available unique words. Since cell station 109 is aware that an adjacent cell is using unique word 2 in time slot 2, it may compare unique words 1 and 3 to determine which word has the lower cross correlation with word 2, and set that word to the highest priority. If unique word 1 has the lower correlation effects, then its priority may be moved from 2 (see table 119) to 1, and unique word 3 would be set to priority 2. If unique word 3 already has the lowest correlation effects, then the priority as shown in table 119 would be maintained. Also, cell station 109 may have a larger list 124 of available, but unassigned, unique words. The unique words in list 124 may also be compared to unique word 2, and the priority of the words may be adjusted according to cross correlation effects with unique word 2. In use, the word from list 124 that has the lowest cross correlation with UW 2 would be promoted for active assignment, and unique word 2 would be moved to list 124 at the lowest priority. In this way, as cell station 109 becomes aware of unique words used in adjacent cell, the list of assignable unique words is updated, and the priority of the other available unique words is adjusted.

Figure 4:
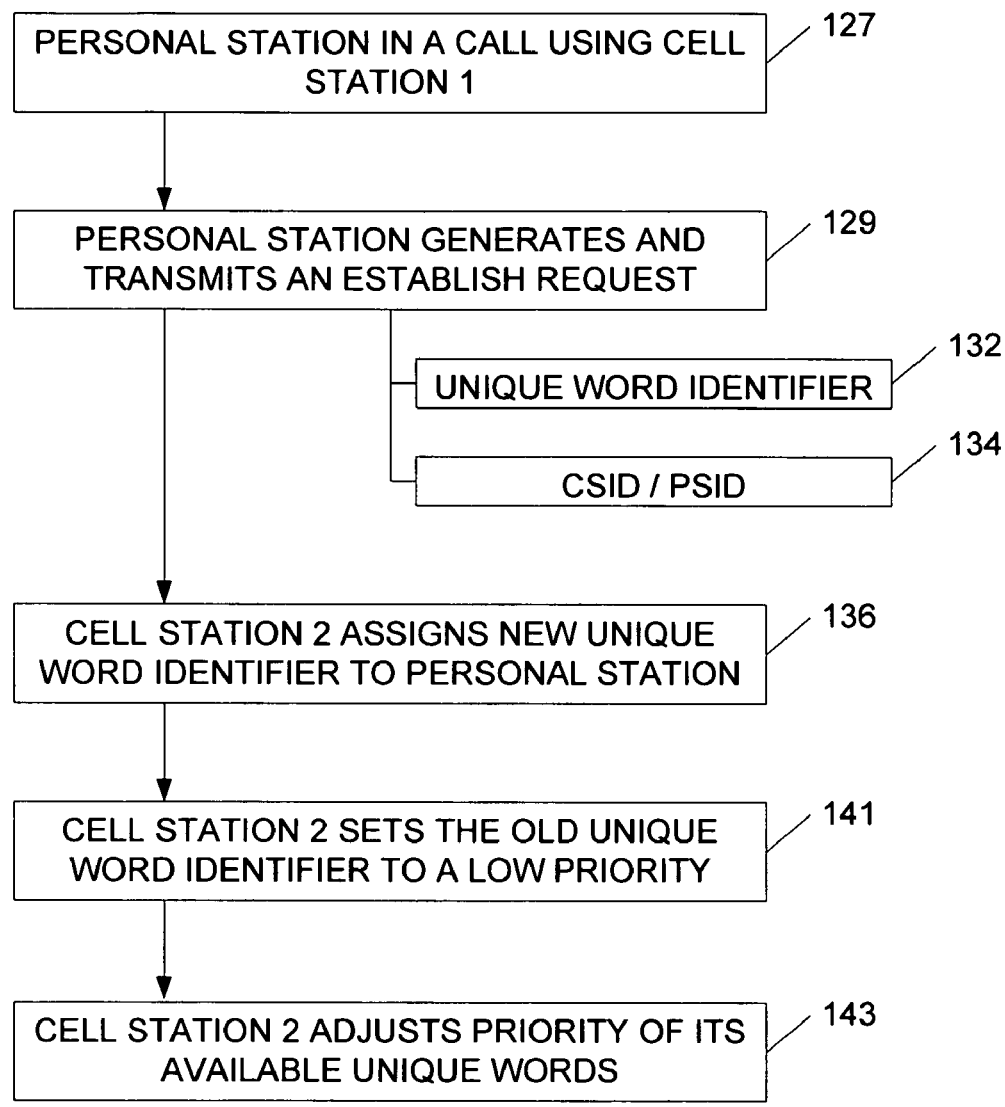
FIG. 4 is a flowchart of a method for assigning a unique word to a personal station in accordance with one embodiment of the present invention.

Referring now to FIG. 4, a method for generating an establish request is illustrated. Method 125 has a personal station presently in a communication or call with cell station 1 as shown in block 127. The personal station generates and transmits an establish request as shown in block 129. This establish request includes a unique word identifier as shown block 132, and includes an identifier such as CSID or PSID for uniquely identifying the personal station or its cell station 1. In some cases, as when the personal station is in a handoff condition, cell station 2 will receive and react to the establish request. In this case, cell station 2 assigns a unique word to the personal station as shown in block 136. Cell station 2 maintains a list of available unique works, and may assign a subset of those words to active personal stations. The list of unique words is prioritized by cell station 2. In this way, the assigned unique word is a high priority unique word as determined by cell station 2. Station 2 is also able to extract the old unique word that the personal station was using when communicating with cell station 1. Cell station 2 is then able to set that unique word to a low priority as shown in block 141.

Cell station 2 may also use the old unique word, which was recently used by an adjacent cell, to adjust priority of its available unique words, as shown in block 143. In one example, cell station 2 may compare its set of available unique words to the old unique word to determine a level of similarity or correlation. Words that are more similar or have higher correlation effects would be set to a lower priority, enabling the more desirable unique words to be set to a higher priority. It will be appreciated that the reprioritizing as shown in blocks 141 and 143 may be done before or after the assignment of the new unique word as shown in block 136.

Figure 5:
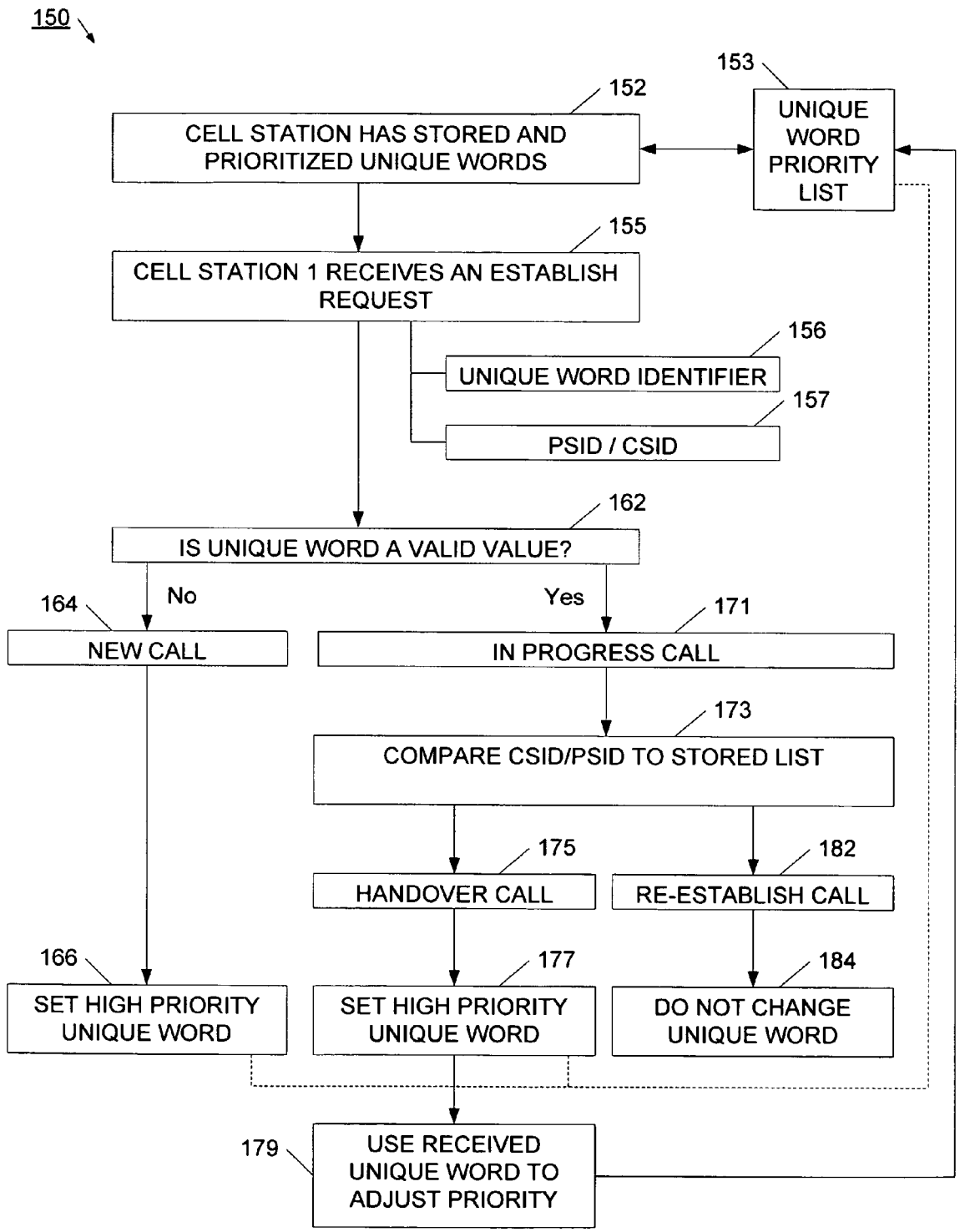
FIG. 5 is a flowchart of a method for assigning a unique word to a personal station in accordance with one embodiment of the present invention.

Referring now to FIG. 5, a method for prioritizing unique words is illustrated. Method 150 has a cell station which stores unique words as shown in block 152. These unique words may be stored according to a priority. These words may have an initial priority set according to some default condition, and the priority is updated according to knowledge gained about unique words used in adjacent cells. As illustrated in method 150, a cell station receives an establish request as shown in block 155. The establish request includes a unique word identifier is shown in block 156, which identifies the unique word the personal station is currently using. The personal station has also included a PSID or CSID as shown in block 157 to identify whether the personal station is a new or arriving personal station. The cell station determines if the unique word from the establish request is a valid unique word as shown in block 162. In one example, the unique word identifier may be all zeros (indicative of an invalid value in this case), which indicates the establish request is requesting a new call as shown in block 164. In this case, cell station 1 selects a high priority unique word and assigns that to the personal station as shown in block 166.

If the received unique word is a valid value, then the cell station may determine that the personal station has a call in progress as shown in block 171. This call may be in progress with either an adjacent cell station, or may be in progress with the current cell station. In order to determine which cell station is in use, cell station 1 compares the CSID or PSID to its stored list as shown block 173. If the cell station determines that the personal station is already in communication with it, then it is determined that it is a reestablish call as a shown block 182. In this case, the cell station may determine not to change the unique word and continue communication with the personal station. In another example, the cell station may compare the unique word currently in use to its priority list, and adjust the unique word to a higher priority value in an attempt to increase sensitivity and cross correlation effects.

The cell station may determine that the personal station is arriving from an adjacent cell and is therefore a handle recall as shown in block 175. The cell station may allow the personal station to continue using the unique word it's already using, or may assign another high priority unique word as shown in block 177. The cell station also knows the unique word value that the personal station was using in the adjacent cell. That value is then used to adjust priority of the words in the unique word priority list 153 as shown in block 179. In this way, over time, the unique word priority list 153 will identify unique words likely to interfere with those in use in adjacent cells, and set those unique words to a low priority value. More particularly, this allows unique words to be assigned which have a more likely opportunity to have desirably low cross correlation characteristics and improved sensitivities.

Figure 6:
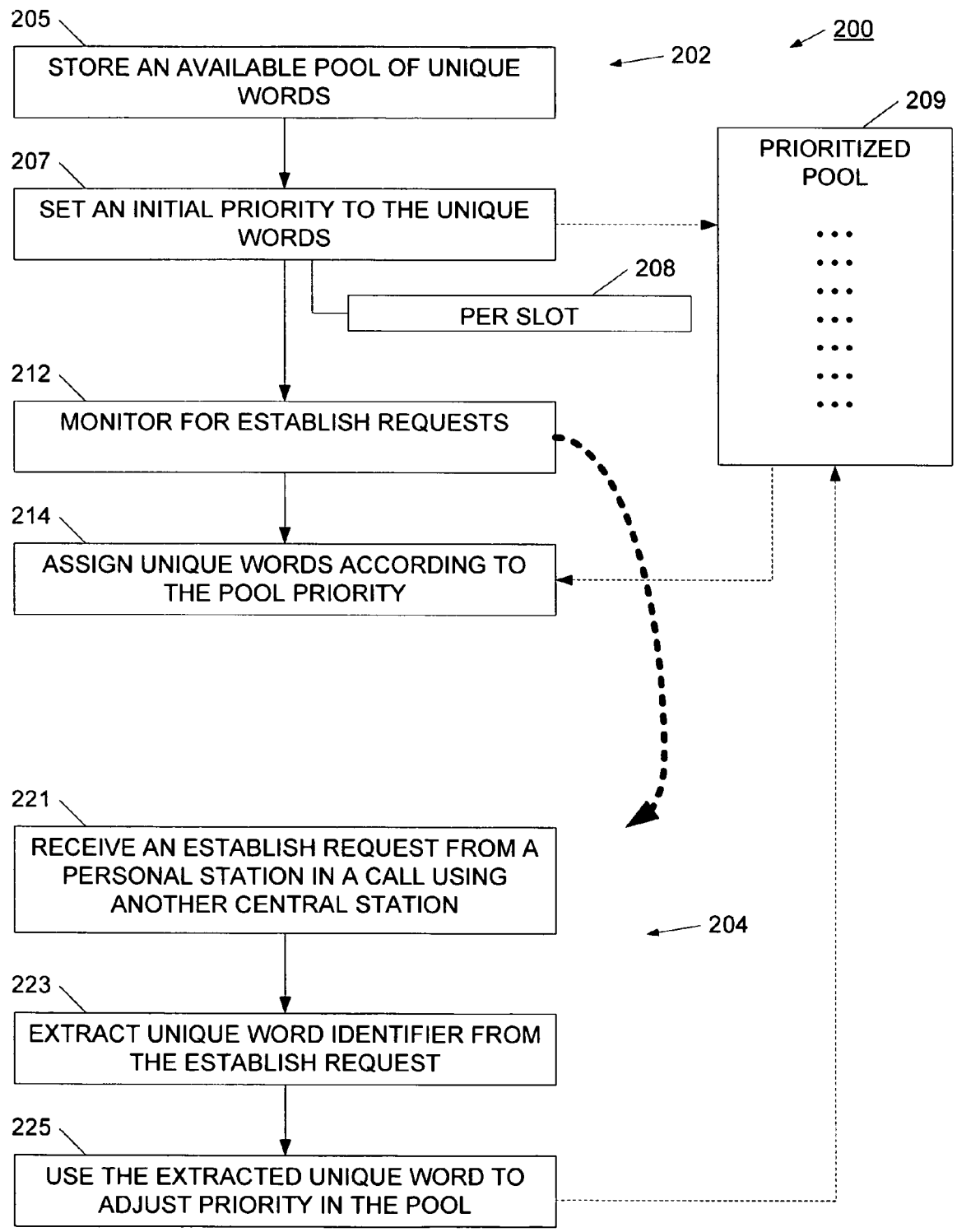
FIG. 6 is a flowchart of a method for prioritizing a list of available unique words for an SDMA communication system in accordance with one embodiment of the present invention.

Referring now to FIG. 6, a method of prioritizing unique words illustrated. Method 200 has a cell station which stores an available pool of unique words as shown in block 205. The pool of unique words may be assigned an initial priority as shown in block 207. In one particular example, the priorities are set on a per timeslot basis as shown in block 209. However, it will be appreciated the priorities may be set according to other arrangements. The cell station then monitors for establish request as shown in block 212. As establish requests are received, the cell station then assigns unique words according to the pool priority as shown in block 214. As illustrated in method 200, cell station operates a use process 202 for assigning unique words from the prioritized pool 209, and has a prioritization process 204 for adjusting the priority within the prioritize pool 209. It will be understood that other processes may be used to adjust the priority of individual unique words, as well as process 204.

Process 204 is initiated responsive to an establish request. The cell station may determine that the establish request is made from a personal station that is in a call with an adjacent cell station as shown block 221. In this case, the cell station can extract the unique word identifier or unique word from the establish request as shown in block 223. The extracted unique word may be used to adjust the priority of the unique words in pool 209. For example, unique words in the pool that have a higher cross correlation with the extracted unique word will be set to a lower priority. In a similar manner, words having a more desirable low cross correlation effect will be moved up in priority. Accordingly, over time, prioritized pool 209 identifies unique words likely to interfere with words used in adjacent cells, and sets those unique words to a low priority. In this way, higher priority unique words assigned by the cell station are more likely to have desirably low cross correlation characteristics, as well as improve overall communication sensitivity.

While particular preferred and alternative embodiments of the present intention have been disclosed, it will be apparent to one of ordinary skill in the art that many various modifications and extensions of the above described technology may be implemented using the teaching of this invention described herein. All such modifications and extensions are intended to be included within the true spirit and scope of the invention as discussed in the appended claims.

What is claimed is:

1. A method for assigning a unique word to a personal station in an SDMA (Spatial Division Multiple Access) communication system, the SDMA communication system having a set of available unique words comprising:

receiving a request message at a cell station having a directable antenna, the request message being sent from the personal station;

extracting information from the request message that is indicative of a first unique word;

determining if the personal station is being handed off from another cell;

comparing, if the personal station is being handed off, the first unique word to the set of unique words, the unique words in the set of unique words are each for use by the cell station in directing the antenna, the comparing including determining a level of cross correlation between the first unique word and each of the unique words in the set of available unique words; and adjusting priority of the unique words based on the comparison of the first unique word to the set of unique words, the adjusting priority including setting unique words with lower cross correlation effects to a higher priority.

2. The method according to claim 1, further comprising:

selecting a high priority unique word from the set of unique words; and generating an assignment message including the high priority unique word.

3. The method according to claim 1, further comprising:
receiving an establish request from a second personal station;
selecting a high priority unique word from the set of unique words; and
generating an assignment message to assign the selected unique word to the second personal station.

4. The method according to claim 1, wherein the request message is received as an establish request message.

5. The method according to claim 1, wherein the personal station is operating as a PHS personal station communicating with a PHS cell station.

6. The method according to claim 1, further comprising:
maintaining, if the personal station is not being handed off, the current priority in the set of unique words.

7. The method according to claim 1, further comprising:
determining if the personal station is requesting to make a new call;
selecting a high priority unique word from the set of unique words; and
generating an assignment message to assign the selected unique word to the personal station.

8. The method according to claim 7, wherein determining if the personal station is requesting to make a new call includes evaluating the extracted message to determine if a valid unique word is indicated.

9. The method of claim 1, wherein the cell station is configured to use the unique words in directing the antenna.

10. The method of claim 1, further comprising:
assigning one of the unique words in the set of unique words to the mobile station.

11. The method of claim 10, further comprising:
employing the assigned unique word to direct the directable antenna.

12. The method of claim 11, wherein employing the assigned unique word to direct the directable antenna includes using the assigned unique word to determine the spatial signature of the personal station.

13. A method for assigning unique words from a cell station to a set of personal stations, comprising:
storing a set of unique words for the cell station where the unique words are each for use by the cell station in directing an antenna, the set of unique words including about 10 unique words and a number of unique words that are permitted to be assigned is about 3;
receiving an establish request from an arriving personal station, the arriving personal station also communicating with another cell station;
extracting information from the establish request to determine an adjacent unique word used by an arriving personal station;
prioritizing the set of unique words according to correlation with the adjacent unique word; and
assigning unique words from the set of unique words so that higher priority words are assigned before lower priority unique words are assigned.

14. The method according to claim 13, wherein the prioritizing step includes identifying a unique word in the set of unique words that has a low cross correlation effect with the adjacent unique word, and setting that identified unique word to have a high priority.

15. The method according to claim 13, wherein the prioritizing step includes identifying a unique word in the set of unique words that has a high cross correlation effect with the adjacent unique word, and setting that unique word to have a low priority.

16. The method according to claim 13, wherein the set of unique words is organized according to time slot number.

17. The method according to claim 16, wherein unique word priority is set independently for each time slot number.

18. The method according to claim 13, wherein the arriving personal station is operating as a PHS personal station and the cell station is operating as a PHS cell station.

19. A method for prioritizing the assignment of unique words from a base station, comprising:
storing a set of unique words that are useful in implementing an SDMA (Spatial Division Multiple Access) communication process, the unique words each being for use by the base station in directing an antenna, a subset of the set of unique words including a set of assignable unique words;
receiving a request message that is indicative of a first unique word;
determining that the first unique word is in use at an adjacent base station;
comparing the first unique word to at least some of the unique words in the set of available unique words; and
adjusting priority of the unique words in the set of unique words according to the comparison, the adjusting including replacing one of the unique words in the set of assignable unique words, and placing the replaced unique word at a lower priority in the set of unique words.

20. The method according to claim 19, wherein the request message is generated by a mobile device, and the mobile device is operating as a PHS personal station and the base station is operating as a PHS cell station.

21. The method according to claim 19, wherein the request message is received as a PHS establish request message.

22. The method according to claim 19, wherein the comparing step comprises comparing the cross correlation between the first unique word and at least some of the unique words in the set of available unique words.

* * * * *